United States Patent [11] 3,592,999

[72] Inventor Joseph F. Quaas
 Island Park, N.Y.
[21] Appl. No. 22,054
[22] Filed Mar. 23, 1970
[45] Patented July 13, 1971
[73] Assignee Eutectic Corporation
 Flushing, N.Y.

[54] WELDING ELECTRODE
 7 Claims, No Drawings
[52] U.S. Cl. ..................................................... 219/146
[51] Int. Cl. ........................................................ B23k 35/22
[50] Field of Search ........................................... 219/145,
 146, 73, 76; 117/202, 203, 204, 205, 206, 207;
 148/24, 2

[56] References Cited
UNITED STATES PATENTS
3,211,582 10/1965 Wasserman et al. ........... 117/206 X

*Primary Examiner*—J. V. Truhe
*Assistant Examiner*—Lawrence A. Rouse
*Attorney*—Gladstone H. Kapralos ABSTRACT: This invention relates to a coated welding electrodes which deposit upon a base metal a deposit with high wear and abrasion resistance properties. These welding electrodes have a unique core, comprising a mild steel tube and a fill of sintered tungsten carbide. The electrode coating contains a high concentration of iron bearing carbide forming elements.

3,592,999

WELDING ELECTRODE

Generally, there has been a wider industrial use of welding electrodes that deposit a weld metal of an alloy with exceptional wear and abrasion resistance properties. The alloy deposit must contain a high concentration of the carbides of various metals. Additionally, because these electrodes are utilized to overlay very large surface areas, it is highly desirable for these electrodes to have as high burn-off and deposition rates as possible.

It is the general object of the present invention to provide a coated welding electrode that can weld deposit a high carbide containing alloy with superior wear and abrasion resistant properties.

Another object of the invention is to provide a coated welding electrode with an extremely superior rate of weld metal deposition.

Yet another object of the present invention is to provide a coated welding electrode with an extremely high rate of burn-off.

In the area of welding known as surfacing or hardfacing, industry has always been faced with the problem of providing a weld deposit surface (on a base metal) with good wear abrasion and crack resistance properties over great areas. Generally, the deposition of highly alloyed carbide bearing weld deposits are made with coated welded electrodes. The automatic and other bulk welding methods, which provide the higher weld deposition rates, are not as suited as the use of coated welding electrodes, in the deposition of carbide bearing hardfacing alloys. The use of coated welding electrodes dictates a curtailed work output rate especially where large areas are involved.

Obviously, there has been an essential need by industry for a coated hardfacing welding electrode that can provide carbide bearing alloy deposits with improved weld deposit deposition rates. One formidable problem has been the requirement for the alloy structure to contain a high percent concentration of percipitated carbides.

After the exploration of a large number of formulations, it was discovered that iron bearing carbide percipitating elements such as ferrotitanium, ferroboron, ferrovanadium, ferrocolumbium, ferromolybdenum, ferrotungsten, when utilized with iron powder and tungsten carbide and other suitable formulation elements will percipitate and form carbides in the alloy weld deposit at an extremely high efficiency rate. Consequently with the use of these iron bearing carbide percipitating elements, it was found that coated electrodes could be developed with the ability to deposit carbide bearing hardfacing alloys at unusually high deposition rates.

A typical hardfacing electrode as known in the art will weld deposit a hardfacing alloy at a rate of 3.6 pounds per hour. Electrodes of the present invention can deposit a similar alloy at a deposition rate of 6.4 pounds per hour. Also, the electrodes of the present invention are capable of average burn-off rates of at least 40 percent higher than similar standard electrodes.

Examples of the core and coating formulation of electrodes of the present invention are as follows:

CORE

The core of the electrodes comprise a standard mild steel tube filled with a carbide such as tungsten carbide, vanadium carbide, titanium carbide. The tube can be of any of the class of mild steel alloys well known in the art and can be similar to the length, wall thickness and other size characteristics of the known mild steel tubes that are used as electrode cores. The tungsten carbide can also be of that that is commonly commercially available such as for example standard sintered tungsten carbide. The amount of tungsten carbide fill in the core can range from 30 to 88 percent by weight of total core weight. The tubing therefore ranges from 12 to 60 percent by weight of total core weight.

FLUX COATING

The flux coating comprises 35 to 67 percent by weight of the total electrode weight and comprises as a unit the following constituents in the weight percentages indicated:

| Constituent | Broad range, by weight percent | Preferred range, by weight percent | Example, by weight percent |
|---|---|---|---|
| Barium carbonate | 17.5-30 | 20-27.5 | 24 |
| Carbon | 6-14 | 7.2-12.5 | 6.1 |
| Alkaline earth fluorides | 7-15 | 9.5-13 | 13.0 |
| Slip agents | 0-3 | .5-1.7 | .7 |
| Iron powder | 8-35 | 12-30 | 24.2 |
| Iron bearing carbide | | | |
| Precipitating elements | 10-40 | 15-37 | 24 |
| Tungsten carbide | 2-13 | 3-9 | 9 |

The flux is mixed with a binder and the flux coating to adhere on the core. The binder is mechanically mixed in the flux coating and can be in a weight percent range of 8 to 25 percent.

Examples of known carbon elements are coal, charcoal, graphite, etc.

Examples of known alkaline earth fluorides are fluorospar, sodium fluoride, calcium fluoride, lithium fluoride, etc.

Examples of known slip agents are aluminum silicate, bentonite, clay, etc.

Examples of known iron bearing carbide percipitating elements are ferrotitanium, ferroboron, ferrovanadium, ferrocolumbium, ferromolybdenum, ferrotungsten, etc.

Examples of known binders are sodium and potassium silicates.

The electrodes can be manufactured by any of the electrode manufacturing methods well known in the art such as for example with an extrusion press. The tubes can be filled by again many well-known methods such as by gravity.

It will now be understood by those skilled in the art that the objects of this invention have been achieved by providing a welding electrode that will deposit a carbide structured hardfacing alloy where such weld deposition is accomplished at considerably improved weld deposition rates.

I claim:

1. A welding electrode comprising a tubular core; a fill in said core; and a flux coating disposed on said tubular core; said flux coating comprising the following constituents in the weight percentages indicated:

| Constituent: | Broad range, by weight percent |
|---|---|
| Barium carbonate | 17.5-30 |
| Carbon | 6-14 |
| Alkaline earth fluorides | 7-15 |
| Slip agents | 0-3 |
| Iron powder | 8-35 |
| Iron bearing carbide | |
| Percipitating elements | 10-40 |
| Tungsten carbide | 2-13 |
| A binder | 8-25 |

2. The welding electrode of claim 1 wherein said tubular core is a mild steel alloy.

3. The welding electrode of claim 1 wherein said fill is taken from the group consisting of tungsten carbide, vanadium carbide and titanium carbide.

4. The welding electrode of claim 1 wherein said fill comprises from 30 to 88 percent by weight of the weight of the tubular core.

5. The welding electrode of claim 1 wherein said coating comprises up to 67 percent by weight of the resultant electrode.

6. The welding electrode of claim 1 wherein its rate of deposition of weld metal exceeds 6 pounds per hour.

7. The welding electrode of claim 1 wherein said flux coating comprises the following constituents in the weight percentages indicated.

| Constituent: | Preferred range, by weight percent |
|---|---|
| Barium carbonate | 20-27.5 |

| | |
|---|---|
| Carbon | 7.2-12.5 |
| Alkaline earth fluorides | 9.5-13 |
| Slip agents | .5-1.7 |
| Iron powder | 12-30 |
| Iron bearing carbide | 15-37 |
| Precipitating elements | 3-9 |
| Tungsten carbide | 3-9 |
| A binder | 10-22 |